Jan. 5, 1965        B. F. ROBINSON        3,164,411
TAILGATE UNLATCHING DEVICE FOR DUMP TRUCK
Filed July 26, 1963        3 Sheets-Sheet 1

INVENTOR
Benjamin F. Robinson
BY Bacon & Thomas
ATTORNEYS

INVENTOR
Benjamin F. Robinson

BY Bacon & Thomas

ATTORNEYS

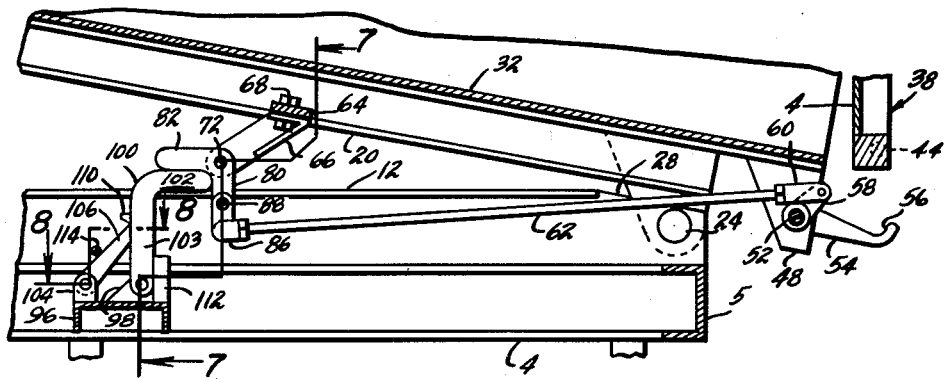
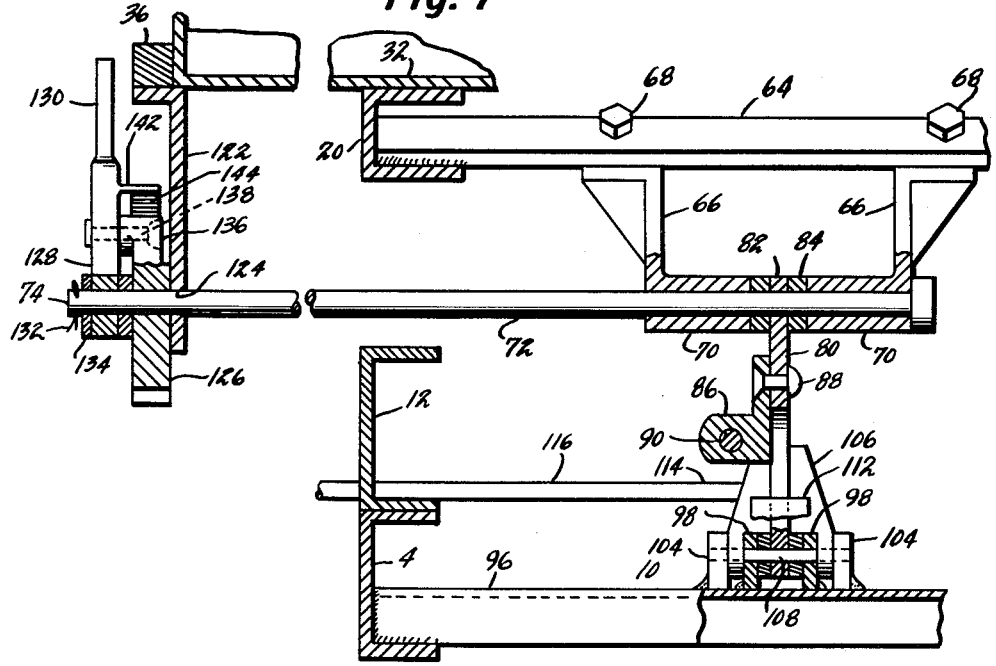
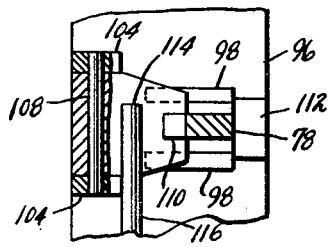

United States Patent Office 3,164,411
Patented Jan. 5, 1965

3,164,411
TAILGATE UNLATCHING DEVICE FOR
DUMP TRUCK
Benjamin F. Robinson, 5240 Forest Road, Columbus, Ga.
Filed July 26, 1963, Ser. No. 297,822
11 Claims. (Cl. 298—23)

This invention relates generally to tailgate latches for dump truck vehicles and the like, and more particularly to an improved tailgate unlatching device constructed for either automatic or manual operation.

The use of dump trucks for hauling bulk materials is wide spread, especially in the construction industry. Typically, a dump truck vehicle comprises a chassis having a dump box pivotally mounted thereon. The dump box includes a front wall and a pair of side walls, and is fitted with a tailgate across the rear, open end thereof, the tailgate being pivoted near the opposite top edges thereof to the rear edges of said side walls. A latch is provided on the dump box to hold the tailgate closed, and is operable to release the tailgate when desired, the latch of the invention being operable either manually or automatically by the vertical movements of the dump box.

In use, bulk material or the like is placed in the dump box, and the vehicle is then driven to the desired emptying site. The front of the dump box is then raised upwardly, and the tailgate latch is opened to release the tailgate to swing about its upper edge. The bulk material contained within the dump truck body then flows outwardly past the open tailgate.

The present invention is directed to a novel device for unlatching, or opening, the tailgate latch on a dump truck. The unlatching device of the invention is constructed for either manual or automatic operation, whereby to accommodate different use situations. When operated in its automatic mode, the device of the invention will automatically open the tailgate latch during the elevation of the front of the dump box above the truck chassis; when the dump box is lowered back onto the truck chassis, the latch will be automatically returned to its closed position.

It frequently is desirable to open the tailgate latch on a dump truck when the dump box is in its lowered position, resting on the chassis. The automatic feature of the invention is constructed so that it can be manually disabled, after which the unlatching device can be operated manually to open the tailgate latch.

The unlatching device of the invention includes an actuator arm, which is pivotally mounted to the underside of the dump box. The actuator arm has a generally L-shaped configuration, and is secured at the junction of the two arms thereof to a supporting shaft, said shaft being rotatably mounted under the dump body, and having one end thereof extending outwardly for reception of a manual operating handle means. A connecting rod extends between one of the two arms of the actuator arm and the tailgate latch mechanism. Thus, pivotal motion of the actuator arm about the axis of its supporting shaft will cause the connecting rod to move sufficiently to operate the tailgate latch.

The chassis of the truck has a trip mechanism mounted thereon in position to engage with the actuator arm. The trip mechanism includes a bracket pivoted at its lower end to a base, and having a protruding bar thereon positioned to engage the actuator arm. A removable brace secures the bracket in a vertical position for automatic operation of the invention, and is removable to disable the trip mechanism, whereby the actuator arm can then be manually operated. When the brace holding the trip bracket has been disabled, the operating handle means on the actuator arm supporting shaft can be manipulated to manually operate the unlatching device of the invention.

It is an object of the invention to provide a dump truck tailgate unlatching device constructed for either automatic or manual operation, and provided with means to render the automatic feature thereof inoperative when desired.

A further object is to provide a trip mechanism for a tailgate unlatching device, constructed so that it can be easily rendered inoperative.

It is another object to provide a dump truck tailgate unlatching device constructed to automatically open a tailgate latch upon elevation of the truck's dump box, and to automatically return said latch to its closed position when said dump box is lowered.

Other objects and many of the attendant advantages of the present invention will become readily apparent from the following detailed description, when considered in connection with the accompanying drawings, wherein:

FIG. 6 is a view similar to FIG. 5, but with the dump box in its partially raised position to show the operation of the invention;

FIG. 7 is a fragmentary, vertical sectional view, taken along the line 7—7 of FIG. 6; and FIG. 8 is a fragmentary, horizontal, sectional view, taken along the line 8—8 of FIG. 6.

Figure 1:
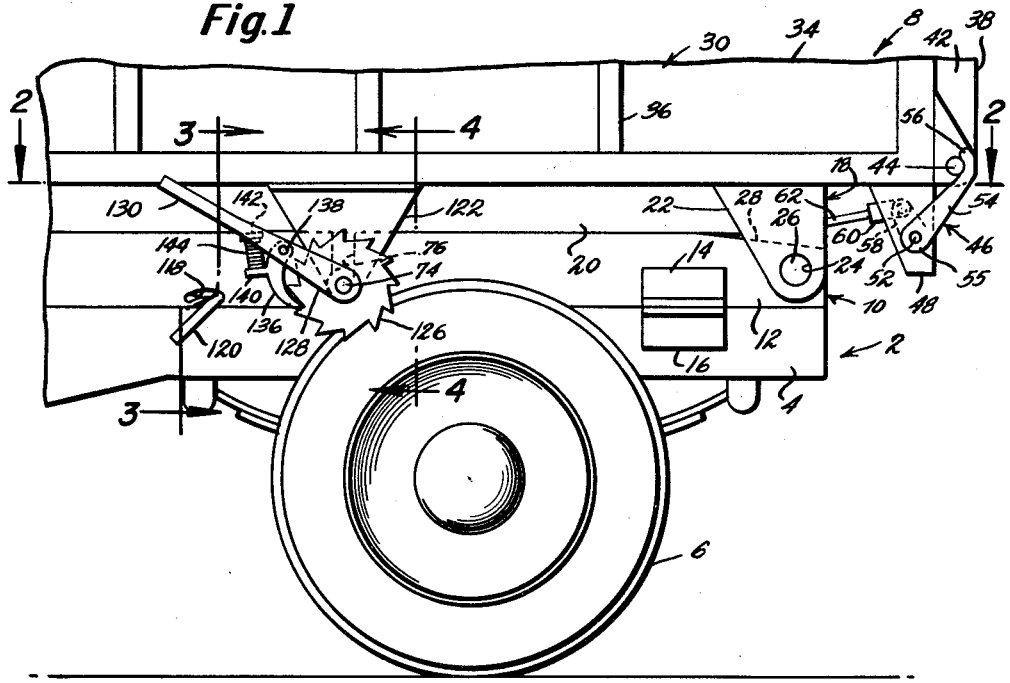
FIG. 1 is a fragmentary, side elevational view of the rear end of a dump truck incorporating the present invention.

Referring now to the drawings, a truck chassis is indicated generally at 2, and includes a pair of confronting channel members 4, having wheels 6 secured near the rear ends thereof in the usual manner. A transverse channel member 5 connects the rear ends of the channel members 4, and a dump body 8 is disposed to rest on the chassis 2.

The dump body 8 includes a lower frame 10, comprising a pair of confronting channel members 12 disposed to rest on the channel members 4. The exterior surfaces of the channel members 12 have angle irons 14 welded thereon, which are positioned to confront similar angle irons 16 welded to the channel members 4. The angle irons 14 and 16 are secured together by welding, or by some other suitable means, and function to secure the lower frame 10 to the chassis 2.

Disposed to rest upon the lower frame 10 is an upper frame 18, said upper frame including a pair of confronting channel members 20 disposed to rest upon the channel members 12. A downwardly projecting hinge member 22 is welded to the external, rear end of each of the channel members 20, and extends downwardly to confront the rear ends of the channel members 12. The hinge members 22 have aligned bores 24 therein for receiving the ends of stub shafts 26, said shafts 26 being secured to the rear ends of the channel members 12 to project outwardly therefrom. Thus, the upper frame 18 is pivotally secured to the lower frame 10 by the stub shafts 26 and the hinge members 22. The top, rear corners 28 of the channel members 12 are cut at an angle to facilitate pivotal movement of the upper frame 18.

Disposed to rest upon the upper frame 18 is a dump box 30, said dump box including a bottom plate 32 which is welded or otherwise secured to the channel members 20. The dump box 30 also includes a pair of vertical side plates 34, and is reinforced at strategic points on the exterior thereof by ribs 36. A tailgate 38 is pivotally secured adjacent the opposite, top edges thereof (not shown) to the rear edges of the side plates 34 in the conventional manner, and is thus arranged to pivot outwardly from the bottom plate 32 when the front of the dump box 30 is elevated. The tailgate 38 includes a plate 40, having reinforcing ribs 42 on the exterior thereof. A pair of oppositely directed pins 44 are secured to project laterally outwardly from the bottom edge of the tailgate 38, and are utilized in conjunction with a latch mechanism 46 to secure said tailgate in a closed position.

The latch mechanism 46 includes a pair of downwardly projecting, L-shaped supporting brackets 48, one of said brackets 48 being secured to each of the outside, rear corners of the dump box 30. The supporting brackets 48 have aligned bores therein for reception of the opposite ends of a transversely extending shaft 52, the opposite ends of said shaft 52 projecting laterally beyond the brackets 48. The collar-bearing end 55 of a latch arm 54 is secured to each projecting end of the transverse shaft 52 to rotate therewith, and each said latch arm includes an arcuate head 56 shaped to engage with its mating latch pin 44 on the tailgate 38.

Disposed on the shaft 52 between the supporting brackets 48 is a crank arm 58, said crank arm having one end thereof secured to said shaft for rotation therewith. The bifurcated end 60 of a connecting rod 62 is pivotally secured to the free arm of the crank arm 58, and is arranged so that movement of the connector rod 62 will cause the latch arms 54 to move into and out of engagement with their associated latch pins 44; when the connector rod 62 is moved forwardly, the latch arms 54 will engage the latch pins 44 to secure the tailgate 38 in position. The movement of the connector rod 62 is controlled by the unlatching device of the present invention.

Referring now in particular to FIGS. 2, 3, 4 and 5, the opposite ends of a transversely extending supporting bar 64 are secured to the confronting lower flanges of the upper channel members 20. A pair of downwardly projecting, spaced supporting brackets 66 are secured centrally of the supporting bar 64 by bolts 68, said brackets 66 terminating at their lower ends in a pair of transversely disposed, aligned collars 70. A supporting shaft 72 has the headed end 73 thereof received within the aligned collars 70, and the opposite end 74 thereof extends laterally to the edge of the dump box 30. The lower frame channel 12 through which the end 74 of the shaft 72 passes has a vertical notch 76 therein (FIGS. 1 and 2), for receiving said shaft. Secured to the shaft 72 between the collars 70 is an L-shaped actuator arm 78.

The actuator arm 78 includes a normally horizontal leg 80, and a normally vertical leg 82, both of said legs 80 and 82 having rounded tips thereon. The legs 80 and 82 constitute lever arms, and lie in a common plane that extends longitudinally of the dump box 30; a transversely extending collar 84 is secured to the actuator arm 78 at the juncture of said legs, or lever arms, 80 and 82, the shaft 72 passing through said collar 84. The actuator arm 78 is secured to the shaft 72 to rotate therewith.

Figure 5:
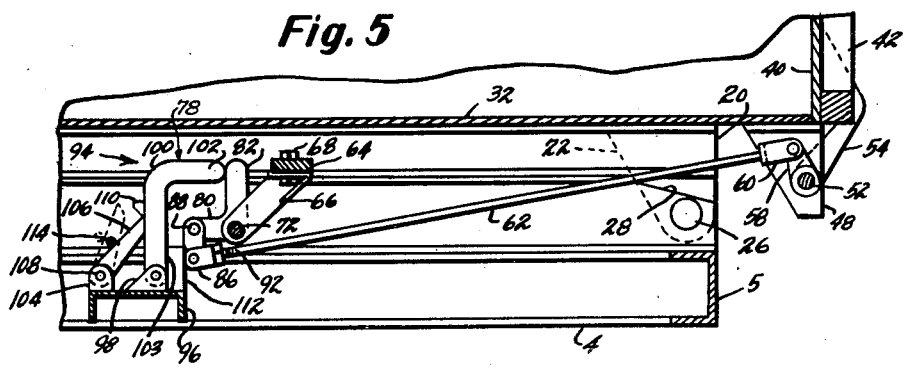
FIG. 5 is a fragmentary, vertical sectional view, taken along the line 5—5 of FIG. 2, and shows the unlatching device of the invention in side elevation, with the dump box in its lowered position.

The free end of the horizontal leg 80 of the actuator arm 78 has the upper end of a generally L-shaped bracket 86 pivotally secured thereto by a pin 88. The lower, generally horizontal leg of the L-shaped bracket 86 has a threaded bore 90 therein, and the threaded, free end 92 of the connecting rod 62 is threaded therein. Thus, the actuator arm 78 is connected to the crank arm 58, whereby pivotal movement of the actuator arm 78 about the axis of the shaft 72 will operate the latch arms 54 to secure and release the tailgate 38. The connecting rod 62 is proportioned so that the latch arms 54 will be in their closed, latching position when the leg 80 of the actuator arm 78 is in its horizontal, forwardly projecting position, as shown in FIG. 5, and so that when said leg 80 has been moved to project vertically downwardly the latch arms 54 will have been moved to their open position.

The actuator arm 78 is operated automatically upon elevation of the front of the dump box 30 by a trip mechanism 94. The trip mechanism 94 includes a downwardly facing, transversely extending channel member, or base 96, the opposite ends of which are secured to the confronting lower flanges on the chassis channel members 4. A pair of spaced, aligned ears 98 are secured to the channel member 96 medially thereof, and the lower end of an L-shaped bracket 100 is pivotally secured therebetween. The bracket 100 includes a normally horizontally extending bar 102, the end of which is rounded, as is the region adjacent the juncture of the vertical leg 103 of said bracket 100 with said bar 102.

A second pair of spaced ears 104 are welded to project upwardly from the forward edge of the base channel member 96 in front of the ears 98, and the lower end of a brace member 106 is pivotally mounted therebetween on a shaft 108. The front face of the vertical leg 103 of the bracket 100 has a detent 110 welded thereto, under which the upper end of the brace member 106 can be engaged. The brace member 106 is proportioned so that it will extend upwardly at about a 45 degree angle when it is engaged under the detent 110, with the vertical leg 103 of the bracket 100 projecting substantially normally from the base channel 96. A vertical stop plate 112 is secured to the rear edge of the base channel 96 behind the bracket 100, and cooperates with the brace member 106 to secure said bracket 100 in a vertical position.

As is best seen from a comparison of FIGS. 5 and 6, the horizontal bar 102 of the bracket 100 functions in the following manner to automatically operate the actuator arm 78. Initially, the leg 80 of the actuator arm 78 is disposed horizontally, as shown in FIG. 5; this condition occurs when the dump box 30 is in its lowered position, and the latch arms 54 are closed. When the front of the dump box 30 is raised above the chassis 2, which is preferably accomplished by a conventional hydraulic mechanism (not shown), the leg 80 will engage with the fixed horizontal bar 102 of the bracket 100.

As the dump box 30 continues to pivot upwardly about the stub shafts 26, the actuator arm 78 will be pivoted, or rotated, counterclockwise by the engagement of the leg 80 with the bar 102. This movement will continue until the leg 80 is disposed vertically, as shown in FIG. 6, at which time the latch arms 54 will have been moved to their open position, thus releasing the lower end of the tailgate 38. The dump box 30 will then be raised in the usual manner to the extent necessary to empty the material therefrom.

When the dump box 30 is lowered, the leg 82 of the actuator arm 78, which assumes a horizontal position during elevation of the box 30, will engage the bar 102 of the bracket 100. As the dump box continues to be lowered, the actuator arm 78 will then be rotated, or pivoted, in a clockwise direction, which movement will cause the latch arms 54 to pivot counterclockwise and engage with the pins 44 to again secure the tailgate 38 in a closed position. It should be noted that the rounded ends on the actuator arms 78 and on the bar 102 of the bracket 100 facilitate the movements of said actuator arm.

Figure 2:
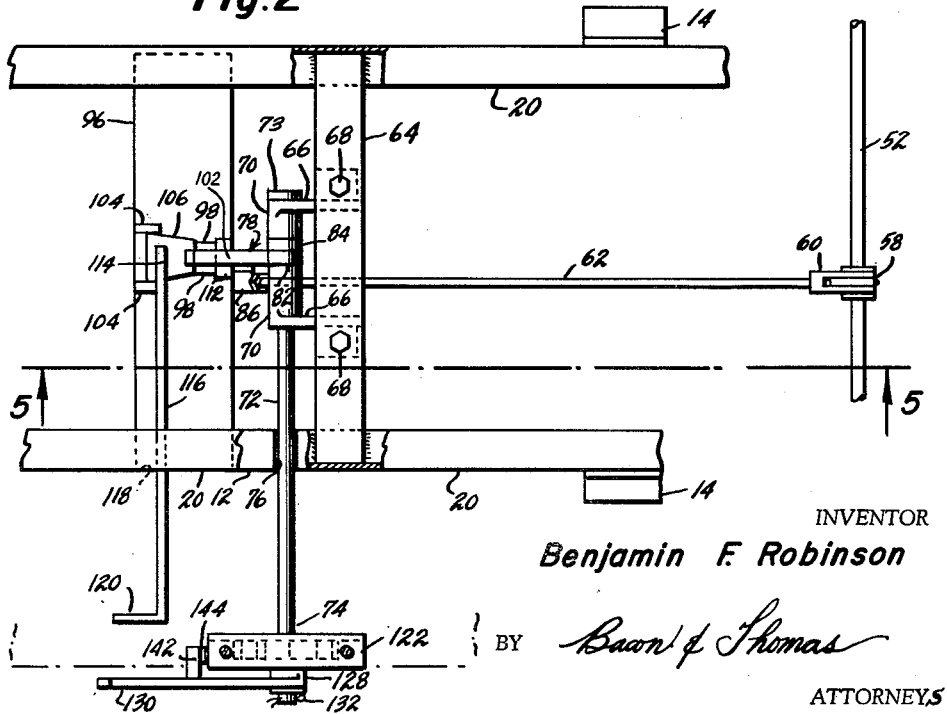
FIG. 2 is a fragmentary, partially broken away, horizontal sectional view taken along the line 2—2 of FIG. 1, showing the unlatching device of the invention.
Figure 3:
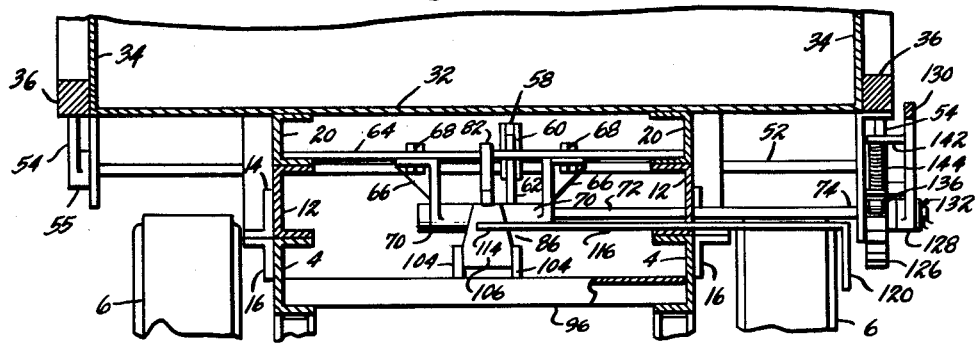
FIG. 3 is a fragmentary, vertical sectional view, taken along the line 3—3 of FIG. 1.
Figure 4:
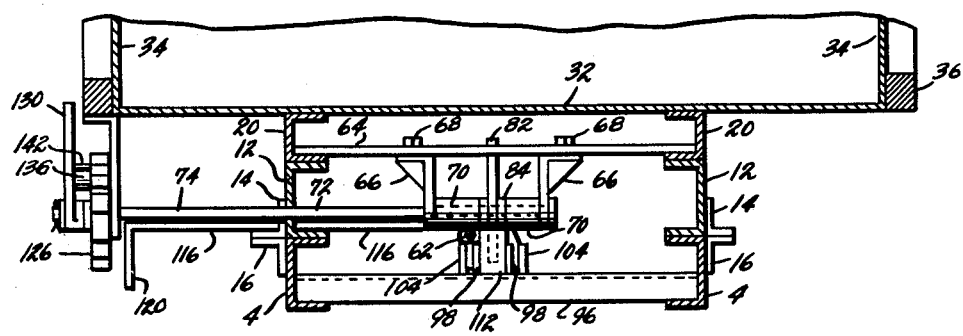
FIG. 4 is a fragmentary, vertical sectional view, taken along the line 4—4 of FIG. 1.

The latch mechanism of the invention is equipped with means to render the automatic trip mechanism 94 inoperative when desired. Referring in particular to FIGS. 1, 2 and 5, one end 114 of an operating rod, or handle, 116 is welded to the top surface of the brace member 106, and extends transversely through an arcuate slot 118 in one of the lower channel members 12. The projecting end of the rod 116 has a bent handle portion 120 thereon to facilitate grasping thereof, and by grasping and turning said handle 120 the brace member 106 can be removed from under the detent 110 to free the bracket 100 for forward pivoting motion. When the brace member 106 has been thus removed, the bracket 100 will be ineffective to operate the actuator arm 78 upon elevation of the dump box 30. The actuator arm 78 can be then manually operated, even with the dump box 30 in its lowered position.

Referring in particular to FIGS. 1, 2 and 7, a downwardly projecting, L-shaped bracket 122 is secured to the lower edge of the dump box 30 in position to confront the free end 74 of the shaft 72, said bracket 122 having a bore 124 (FIG. 7), extending therethrough for receiving said shaft end 74. A ratchet gear 126 is secured to the end 74 of the shaft 72 outwardly of the bracket 122, and is arranged for counterclockwise operation. One end 128 of an operating arm 130 is rotatably received on the shaft end 74 of the shaft 72, and can be held on said shaft end 74 by a pin 132 and a washer 134.

The upper end of an arcuate pawl 136 is pivotally secured to the arm 130 by a pin 138, and the lower end of said pawl 136 extends downwardly to engage with the teeth on the ratchet gear 126. The forward face of the pawl 136 has a projecting lug 140 thereon, which is positioned in vertical alignment with a similar lug 142 on the back face of the arm 130. The opposite ends of a compressed spring 144 are held between the lugs 140 and 142, and said spring 144 thus functions to urge the lower end of the pawl 136 into engagement with the ratchet gear 126. From an examination of FIG. 1, it is evident that the arm 130 may be easily manipulated to rotate the shaft 72 in a counterclockwise direction, whereby to open the latch arms 54.

It is evident that shaft rotating means other than the lever arm 130 might be utilized in the invention. Further, it is also apparent that the shaft 72 can be manually rotated in either direction to either open or close the arms 54, after the trip mechanism 94 has been disabled.

It is thus seen that an unlatching mechanism for a dump truck tailgate has been provided which can be operated in either an automatic or a manual mode. The invention utilizes the same components for operating in both modes, and includes means for rendering the automatic trip mechanism inoperative when manual operation is desired. Thus, a structurally uncomplicated, economical, compact and easily operated tailgate unlatching device has been provided by this invention.

Obviously many modifications and variations of the present invention are possible in the light of the above teachings. It is, therefore, to be understood that within the scope of the appended claims, the invention may be practiced otherwise than as specifically described.

I claim:

1. In a dump truck, comprising: a chassis; a dump box pivotally connected adjacent its lower, rear edge to said chassis: a tailgate pivotally mounted adjacent the opposite ends of its upper edge across the rear of said dump box; and latch means on said dump box arranged to hold said tailgate in a closed position; means operable both automatically and manually to effect opening and closing of said latch means, comprising, in combination: an actuator arm secured to said box, and including a first lever arm portion, and a second lever arm portion arranged at an angle to said first lever arm portion; means connecting said actuator arm with said latch means, and operable to open and close said latch means in response to movement of said actuator arm; trip means on said frame engageable with said first lever arm portion upon elevation of said dump box above said chassis to effect movement of said actuator arm to open said latch, and engageable with said second lever arm portion upon lowering of said dump box from an elevated position to effect movement of said actuator arm to close said latch; means operable to render said trip means ineffective; and manually operable means connected to said actuator arm, and operable to effect opening and closing of said latch when said trip means has been rendered ineffective.

2. The combination as recited in claim 1, wherein said actuator arm is secured to a transversely extending shaft in the juncture region of said first and said second lever arm portions, said shaft being rotatably secured to said dump box.

3. The combination as recited in claim 2, wherein said trip means includes: a base secured to said chassis; a bracket, said bracket being pivoted at one end thereof to said base; a projecting bar on said bracket, and engageable with said lever arm portions; and means for securing said bracket in position with said bar disposed to engage said lever arm portions.

4. The combination as recited in claim 3, wherein said means for securing said bracket includes a brace pivoted at one end to said base, and engageable with said bracket; and wherein said means operable to render said trip means ineffective includes a handle secured to said brace.

5. The combination as recited in claim 4, wherein said manually operable means includes: a gear secured to said shaft; and means mounted on said shaft and engageable with said gear, and operable manually to effect rotation of said gear and said shaft.

6. In combination: a frame; a dump box pivotally connected adjacent its lower, rear edge to said frame; a tailgate pivotally mounted adjacent the opposite ends of its upper edge across the rear of said dump box; latch means on said dump box arranged to hold said tailgate in a closed position; an actuator arm pivotally secured to said box, and including a first lever arm portion and a second lever arm portion disposed at an angle to said first lever arm portion; means connecting said actuator arm to said latch; trip means on said frame, and engageable with said first lever arm portion upon elevation of said dump box above said frame, to move said actuator arm and said connecting means to effect opening of said latch, and engageable with said second lever arm portion upon lowering of said dump box from an elevated position, to move said actuator arm and said connecting means to effect closing of said latch; means connected to said trip means and operable to render it ineffective; and manually operable means connected to said actuator arm for effecting latching and unlatching movements thereof when said trip means has been rendered ineffective.

7. The combination as recited in claim 6, wherein said trip means comprises: a base secured to said frame adjacent said actuator arm; a bracket pivotally secured to said base, and including a bar positioned to engage said first and said second lever arm portions; and removable brace means extending between said base and said bracket, and operable when in place to support said bracket in an operative position relative to said actuator arm.

8. The combination as recited in claim 7, wherein said means operable to render said trip means ineffective comprises a handle secured to said brace means, and operable to disengage said brace means from said bracket.

9. The combination as recited in claim 6, wherein said actuator arm is secured in the region of the juncture of said first and said second lever arm portions to a transversely extending shaft rotatably mounted under said dump box, and wherein said last mentioned means includes: a gear secured to said shaft; and lever means for effecting rotation of said shaft and said gear whereby to pivot said actuator arm to operate said latch.

10. In combination: a frame; a dump box pivotally connected adjacent its lower, rear edge to said frame; a tailgate pivotally mounted adjacent the opposite ends of its upper edge across the rear of said dump box; latch means on said dump box arranged to hold said tailgate in a closed position; a transverse shaft rotatably mounted to the undersurface of said dump box; an actuator arm secured to said shaft, and including a first, normally horizontal lever arm portion, and a second, normally vertical lever arm portion; means connecting said actuator arm with said latch, and arranged to open said latch when said first lever arm portion is moved from its normally horizontal to a generally vertical position; trip means on said frame, including: a base; a bracket pivoted to said base, and including a bar positioned to engage said first lever arm when said dump box is elevated above said frame, whereby to effect opening of said latch, and to engage said second lever arm when said dump box is lowered from an elevated position, whereby to effect closing of said latch; and removable brace means extending between said base and said bracket; means connected to said brace means, and operable to disengage it from said bracket to thereby render said bracket ineffective to operate said actuator arm; and manually operable means connected to said shaft for operating said actuator arm.

11. The combination as recited in claim 10, wherein said last mentioned means comprises: a gear secured to said shaft; and lever means mounted on said dump box, and engageable with said gear.

References Cited by the Examiner

UNITED STATES PATENTS 2,954,995   10/60   Grisé _____ 298—38 X

FOREIGN PATENTS 553,565   2/23   France.

ARTHUR L. LA POINT, *Primary Examiner.*
RALPH D. BLAKESLEE, *Examiner.*